(12) United States Patent
Nishimura

(10) Patent No.: US 8,018,608 B2
(45) Date of Patent: Sep. 13, 2011

(54) IMAGE FORMING DEVICE STORING PRINT DATA CORRESPONDING TO THRESHOLD VALUE

(75) Inventor: Yoshiko Nishimura, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1008 days.

(21) Appl. No.: 11/276,021

(22) Filed: Feb. 10, 2006

(65) Prior Publication Data

US 2006/0176512 A1 Aug. 10, 2006

(30) Foreign Application Priority Data

Feb. 10, 2005 (JP) .................................. 2005-034469

(51) Int. Cl.
*G06F 3/12* (2006.01)
(52) U.S. Cl. ....................................................... 358/1.14
(58) Field of Classification Search ................... 358/1.14
See application file for complete search history.

(56) References Cited

U.S. PATENT DOCUMENTS

| | | | |
|---|---|---|---|
| 6,175,426 B1 | 1/2001 | Hirooka | |
| 6,496,279 B2* | 12/2002 | Kuroi | 358/1.9 |
| 2003/0225936 A1* | 12/2003 | Felske | 709/328 |
| 2004/0012802 A1* | 1/2004 | Allen et al. | 358/1.13 |
| 2004/0136025 A1* | 7/2004 | Moriyama et al. | 358/1.14 |
| 2004/0169884 A1* | 9/2004 | Yamada et al. | 358/1.15 |
| 2004/0252322 A1* | 12/2004 | Gassho et al. | 358/1.14 |
| 2005/0238401 A1* | 10/2005 | Yamada et al. | 400/78 |

FOREIGN PATENT DOCUMENTS

| | | |
|---|---|---|
| CN | 1195804 A | 10/1998 |
| JP | 11/225255 A | 8/1999 |
| JP | 2001/331294 A | 11/2001 |

* cited by examiner

*Primary Examiner* — Benny Tieu
*Assistant Examiner* — Qian Yang
(74) *Attorney, Agent, or Firm* — Global IP Counselors, LLP

(57) ABSTRACT

An image forming device includes a unit for storing received print data in a nonvolatile memory, and for determining whether or not the desired number of prints of the print data is equal to or greater than a previously set threshold value, a unit for printing the desired number of prints of the print data if the desired number of prints is less than the previously set threshold value, and erasing the print data stored in the memory, and a unit for printing the desired number of copies of the print data if the desired number of prints is equal to or greater than the previously set threshold value, and holding the print data in the memory.

14 Claims, 8 Drawing Sheets

| NUMBER OF PRINTS | | |
|---|---|---|
| HOLDING PERIOD | | MINUTES |

*Fig. 2*

IMAGE FORMING DEVICE STORING PRINT DATA CORRESPONDING TO THRESHOLD VALUE

BACKGROUND OF THE INVENTION

1. Field of the Invention

The present invention relates to an image forming device, such as a copying machine, and the like.

2. Background Information

When preparing handouts to be distributed at a meeting, for example, the number of copies needed will be estimated in advance before they are actually printed. If there is an insufficient number of handouts due to an increase in the number of participants after the start of the meeting, additional copies of a handout that has already been copied will be made. However, the previously copied handout is apt to be stapled together, and thus it will be necessary to remove the staples in order to make copies. Also, hand-written notes may have already been made on the handout to be copied, and thus these hand-written notes will also be copied if the handout is copied as it is.

A device shown in Japanese Unexamined Patent Application Publication No. 2001-331294 has been developed, in which a command to store print data and the effective period of the print data are transmitted to a printer together with the print data, the print data and the effective period are stored in a storage unit within the printer, and the print data can be printed during the effective period. However, in this device, it is necessary to transmit a command to store print data and the effective period of the print data, together with the print data, in order to store the print data in the storage. See also Japanese Unexamined Patent Application Publication No. H11-225255.

It is therefore an object of the present invention to provide an image forming device capable of holding print data in a nonvolatile memory when the desired number of prints to be printed is greater than a previously set predetermined value, and thus allow additional printing of the print data to be easily performed.

Another object of the present invention is to provide an image forming device capable of holding original document image data in a nonvolatile memory when the desired number of copies is greater than a previously set predetermined value, and thus allow additional printing of the original image data to be easily performed.

SUMMARY OF THE INVENTION

An image forming device according to a first aspect of the present invention includes a unit that receives a print command that includes print data and a desired number of prints of the print data; a unit that stores the print data in a nonvolatile memory when the print command is received, and determines whether or not the desired number of prints is equal to or greater than a previously set threshold value; a unit that prints the desired number of prints of the print data when the number of prints is less than the threshold value, and then erases the print data stored in the memory; a unit that prints the desired number of prints of the print data when the desired number of prints is equal to or greater than the threshold value, and then holds the print data in the memory; and a unit that prints the print data held in the memory again in response to an operation by a user.

An image forming device according to a second aspect of the present invention is the image forming device of the first aspect, and further comprises a unit that automatically erases the print data held in the memory when a previously set holding period elapses after the print data is stored in the memory.

An image forming device according to a third aspect of the present invention includes a unit that receives a print command that includes print data and a desired number of prints of the print data; a unit that stores the print data in a first memory when the print command is received, and determines whether or not the desired number of prints is equal to or greater than a previously set threshold value; a unit that prints the desired number of prints of the print data stored in the first memory when the number of prints is less than the threshold value; a unit that prints the desired number of prints of the print data stored in the first memory when the number of prints is equal to or greater than the threshold value, and then stores the print data stored in the first memory in a nonvolatile second memory; and a unit that prints the print data held in the second memory again in response to an operation by a user.

An image forming device according to a fourth aspect of the present invention further comprises a unit that automatically erases the print data held in the second memory if a previously set holding period elapses after the print data is stored in the second memory.

An image forming device according to a fifth aspect of the present invention includes a unit that reads an original document when a copying instruction is input thereto, stores the original document image data in a nonvolatile memory, and determines whether or not a desired number of copies is equal to or greater than a previously set threshold value for determining data holding; a unit that prints the desired number of copies of the original document image data when the desired number of copies is less than the threshold value, and then erases the original document image data stored in the memory; a unit that prints the desired number of copies of the original document image data when the desired number of copies is equal to or greater than the threshold value, and holds the original document image data in the memory; and a unit that prints the original document image data held in the memory again in response to an operation by a user.

An image forming device according to a sixth aspect of the present invention further comprises a unit that automatically erases the original document image data held in the memory when a previously set holding period elapses after the original document image data is stored in the memory.

An image forming device according to a seventh aspect of the present invention includes a unit that reads an original document when a copying instruction is input thereto, stores the original document image data in a first memory, and determines whether or not a desired number of copies is equal to or greater than a previously set threshold value for determining data holding; a unit that prints the desired number of copies of the original document image data stored in the first memory when the desired number of copies is less than the threshold value; a unit that prints the desired number of copies of the original document image data stored in the first memory when the desired number of copies is equal to or greater than the threshold value, and stores the original document image data stored in the first memory in a nonvolatile second memory; and a unit that prints the original document image data held in the second memory again in response to an operation by a user.

An image forming device according to an eighth aspect of the present invention further comprises a unit that automatically erases the original document image data held in the second memory when a previously set holding period elapses after the original document image data is stored in the first memory.

According to the present invention, if the desired number of prints to be printed is greater than a previously set predetermined value, the print data will be held in a nonvolatile memory, and thus additional prints of the print data can be easily made.

In addition, according to the present invention, if the desired number of copies is greater than a previously set predetermined value, the original document image data will be held in a nonvolatile memory, and thus additional prints of the original image data can be easily made.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a schematic diagram showing one example of a setting screen to be displayed when a threshold value for determining data holding and a data holding period are set.

DETAILED DESCRIPTION OF THE PREFERRED EMBODIMENTS

Embodiments of the present invention will be described below with reference to the drawings.

First Embodiment

In a first embodiment, the present invention will be applied to a multifunction device having at least a printer function and a copying function.

Figure 1:
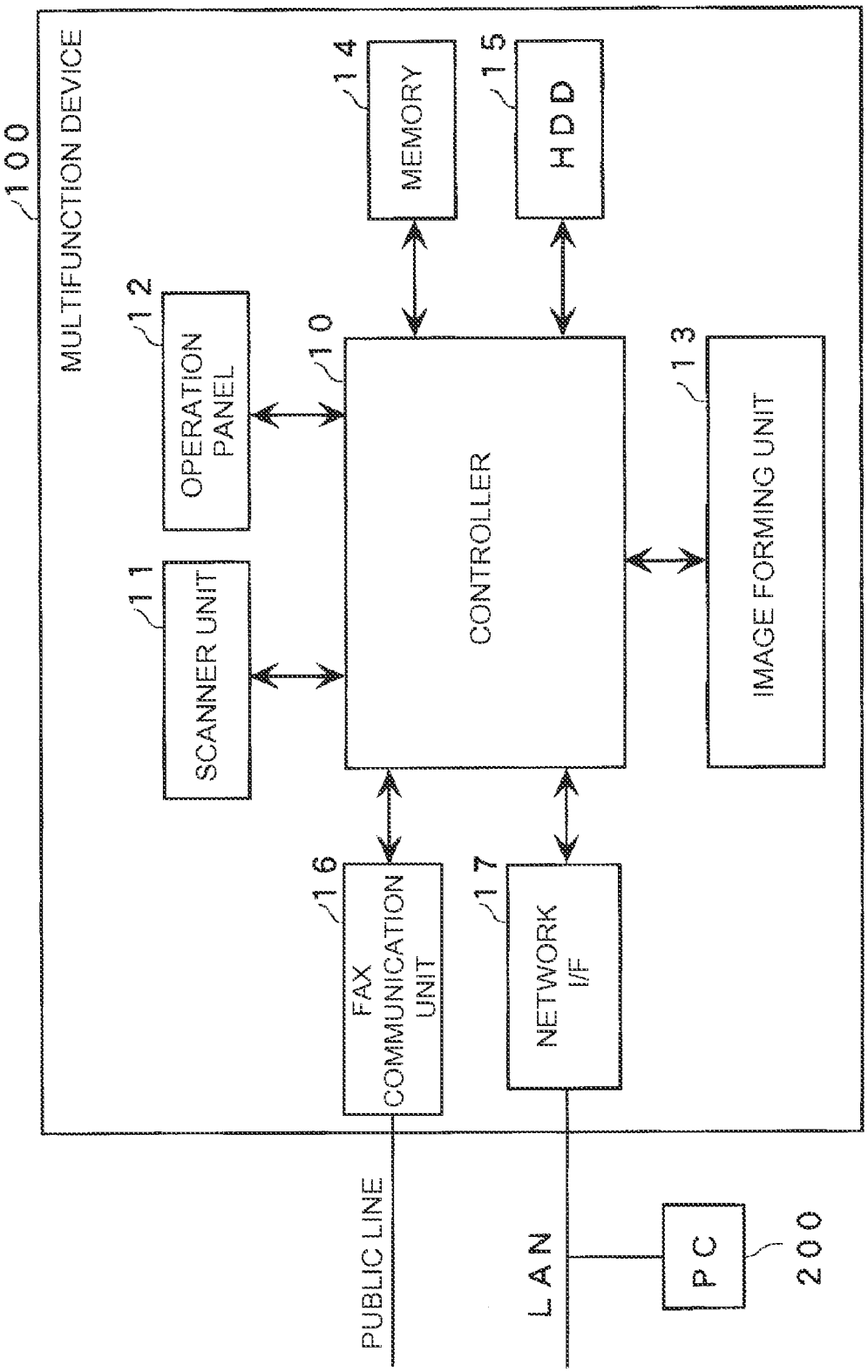
FIG. 1 is a block diagram showing the configuration of a multifunction device.

FIG. 1 shows the configuration of a multifunction device having a printer function, a facsimile function, and a copying function.

A multifunction device 100 has a controller 10. The controller 10 is connected with a scanner unit 11, an operation panel 12, an image forming unit 13, a memory 14, an HDD 15, a fax communication unit 16, and a network I/F 17.

The fax communication unit 16 is connected to a public network. The network I/F 17 is connected to a PC 200 via a LAN. The operation panel 12 includes a display with touch panel, and various keys, such as a start key, and the like.

The PC 200 will transmit a print command that includes print data and the number of prints to be printed to the controller 10 via the network I/F 17, to thereby have the multifunction device 100 print the desired number of prints of the print data. When receiving the print command that includes the print data and the number of prints desired, the multifunction device 100 will temporarily store the print data in a memory (volatile memory) 14, and then store the print data on an HDD (nonvolatile memory) 15. If the desired number of prints is less than a previously set threshold value for determining data holding, the multifunction device 100 will erase the print data stored on the HDD 15 after performing the printing process.

If the desired number of prints is equal to or greater than the previously set threshold value for determining data holding, the print data stored on the HDD 15 will be held for a previously set data holding period, even after the printing process has been completed. In this situation, management data corresponding to the above-described print data stored on the HDD 15 will also be stored on the HDD 15. The management data includes a document number that represents the print data, the date and time (year, month, day, and time of day) that the print data was saved, the date and time that the print data is to be erased, and the storage location of the print data on the HDD 15. The date and time that the print data is to be erased is calculated from the date and time that the print data was saved, and the previously set data holding period. Note that when the date and time to erase the print data arrives, the print data will be erased from the HDD 15.

Figure 2:
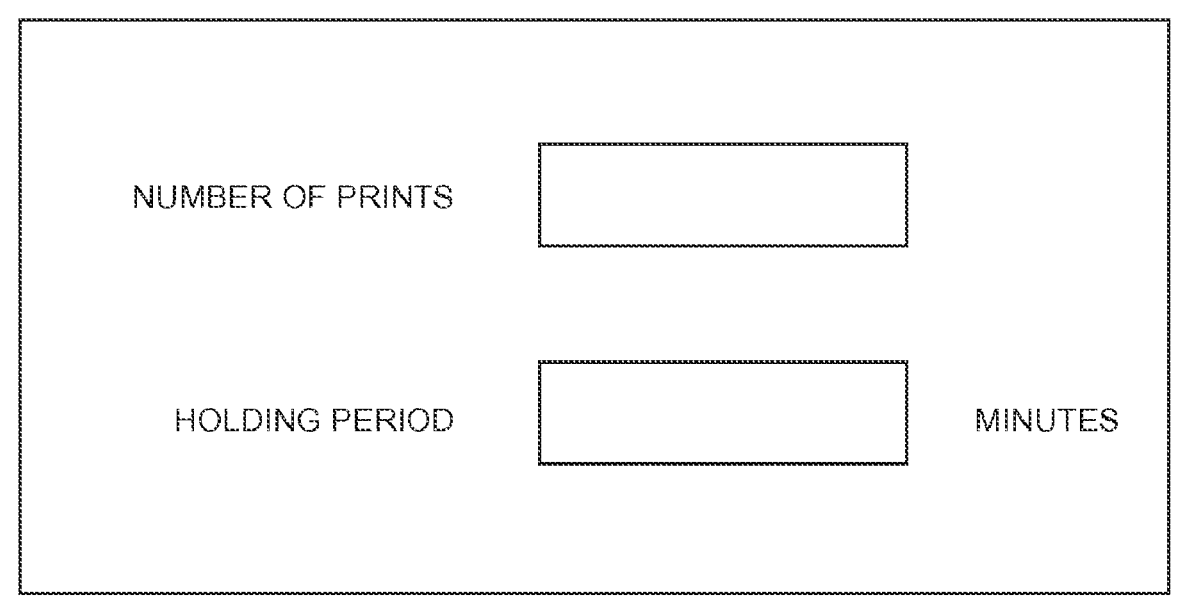

The threshold value for determining data holding and the data holding period are set in the multifunction device 100, and this setting is changeable. FIG. 2 shows one example of a setting screen to be displayed when the threshold value for determining data holding and the data holding period are set. In FIG. 2, "the number of prints" indicates the threshold value for determining data holding, and the "holding period" indicates the data holding period. For example "the number of prints" can be set to 5, and the "holding period" can be set to 60 minutes. Note that the number of prints and the holding period may be set in multiple levels, i.e., if the number of prints is equal to or greater than five, the holding period will be set to 60 minutes, and if the number of prints is equal to or greater than ten, the holding period will be set to 120 minutes.

A user can operate the multifunction device 100 in order to print the print data held on the HDD 15. That is, the user will set a saved document print mode as the operation mode of the multifunction device 100 by operating the operation panel 12. When the saved document print mode is set, the controller 10 of the multifunction device 100 will display a list of the saved document based on the management data stored on the HDD 15. The user will select the desired document for printing from the list on the display. In addition, the user will set the number of prints desired. Then, when the start key is depressed, the desired number of prints of the print data corresponding to the document selected by the user will be printed.

Note that the print data held within the HDD 15 may be printed in response to an operation from the PC 200.

Figure 3:
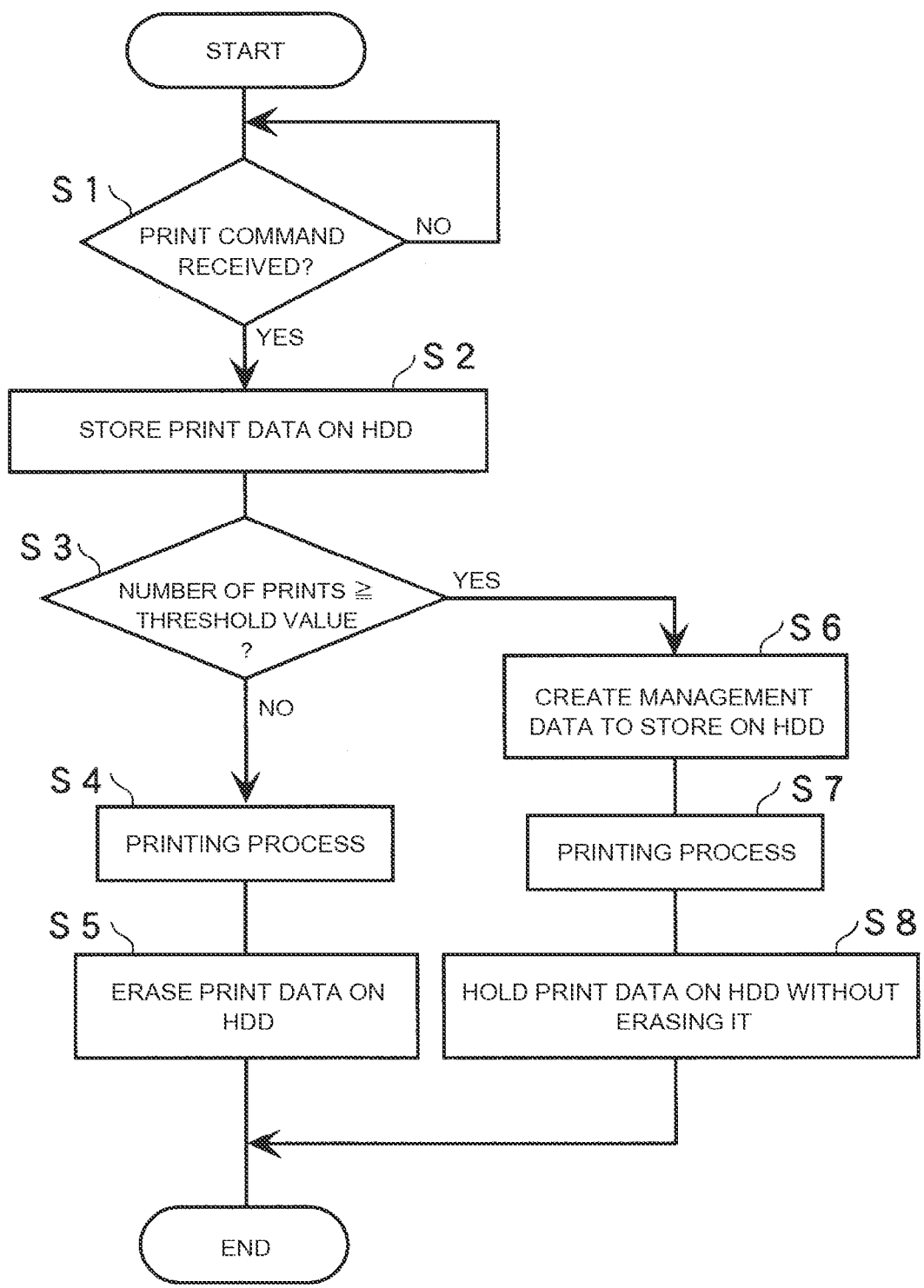
FIG. 3 is a flowchart showing the operation of a multifunction device 100 when a print command that includes print data and the number of prints to be printed is sent from a PC 200 to the multifunction device 100.

FIG. 3 shows the operation of the multifunction device 100 when a print command that includes print data and the desired number of prints is sent from the PC 200 to the multifunction device 100.

When receiving a print command that includes the print data and the desired number of prints from the PC 200 (step S1), the multifunction device 100 will temporarily store the print data in the memory 14, and then store the print data on the HDD 15 (step S2).

Next, it will be determined whether or not the desired number of prints is equal to or greater than a threshold value for determining data holding (step S3). If the desired number of prints is less than the threshold value for determining data holding, the desired number of prints of the print data stored in the memory 14 will be printed (step S4). After completion of the printing process, the print data stored on the HDD 15 will be erased (step S5). Then, the current printing process will end.

If it is determined in step S3 that the desired number of prints is equal to or greater than the threshold value for determining data holding, management data corresponding to the print data stored on the HDD 15 will be created, and stored on the HDD 15 (step S6). The management data includes a document number representing the print data, the date and time (year, month, day, and time of day) that the data was stored, the date and time that the print data is to be erased, and the storage location of the print data on the HDD 15. The date and time that the print data is to be erased will be calculated from the date and time that the print data was stored and the previously set data holding period.

In addition, the desired number of prints of the print data stored in the memory 14 will printed (step S7). Even after completion of the printing process, the print data stored on the HDD 15 will be held thereon without being erased (step S8). Then, the current printing process will end.

Figure 4:
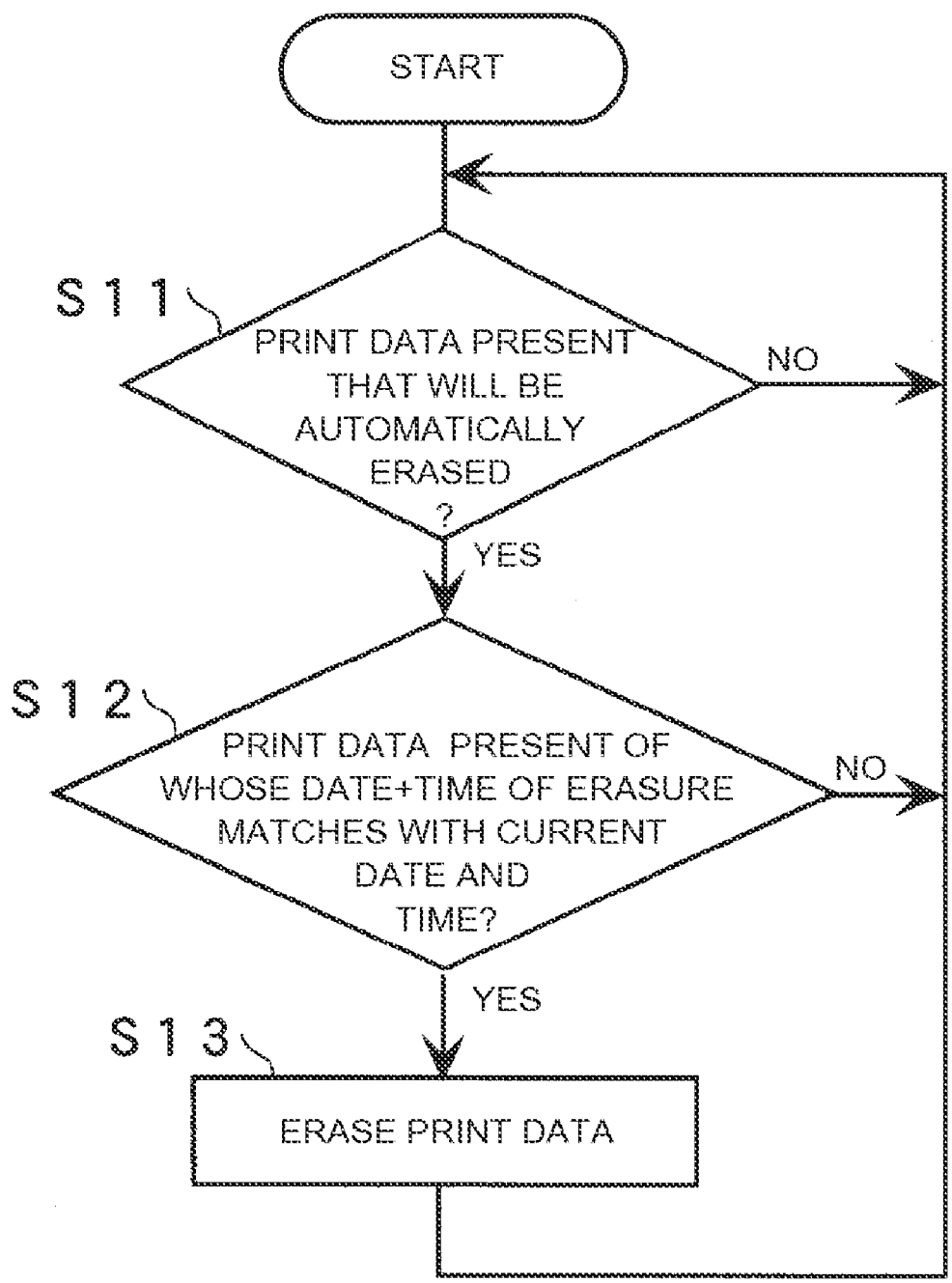
FIG. 4 is a flowchart showing a procedure for automatically erasing print data held on an HDD 15.

FIG. 4 shows a procedure for automatically erasing the print data held on the HDD 15.

First, it will be determined whether or not print data that is to be automatically erased exists on the HDD 15, based on the management data stored on the HDD 15 (step S11). The print data to be automatically erased is print data whose corresponding management data includes the date and time that the print data is to be erased.

If print data to be automatically erased does not exist on the HDD 15, the process returns to step S11. If print data to be automatically erased does exist on the HDD 15, it will be determined whether or not the date and time for automatic erasure matches the current date and time (step S12). If the date and time for automatic erasure does not match the current date and time, the process returns to step S11. If the date and time for automatic erasure matches the current date and time, the print data will be erased, and the corresponding management data will also be erased (step S13). Then, the process will return to step S11.

It is also possible that when erasing the print data, erasure is performed after the print data is blanked, or random data is written over the print data, in view of data security.

According to the above-described first embodiment, when the desired number of prints to be printed in accordance with a print command from the PC 200 is equal to or greater than a threshold value for determining data holding, the print data will be held on the HDD 15 for a predetermined data holding period, and thus it will be possible to easily print the print data held on the HDD 15 during the data holding period. Thus, if an additional handout is needed after a first set of handouts is printed, it will be possible to easily make additional prints of the handout.

In addition, print data will not be held on the HDD 15 when a small number of prints of a handout are to be printed because there will be less possibility that additional prints will be needed, thereby allowing the HDD 15 to be efficiently utilized. Furthermore, because print data that is held on the HDD 15 is automatically erased after a previously set holding period has expired, the HDD 15 can be even more efficiently utilized.

Second Embodiment

In a second embodiment of the present invention, the configuration of the multifunction device is the same as that of the first embodiment. That is, the configuration of the multifunction device is as shown in FIG. 1.

In the above-described first embodiment, when receiving a print command that includes print data and the desired number of prints, the multifunction device 100 will temporarily store the print data in the memory (volatile memory) 14, and then store the print data on the HDD (nonvolatile memory) 15 irrespective of the desired number of prints. However, in the second embodiment, the multifunction device 100 will temporarily store the print data in the memory (volatile memory) 14, and then store the print data on the HDD 15 only if the desired number of prints is equal to or greater than the previously set threshold value for determining data holding, and it will not store the print data on the HDD 15 if the desired number of prints is less than the previously set threshold value for determining data holding.

Figure 5:
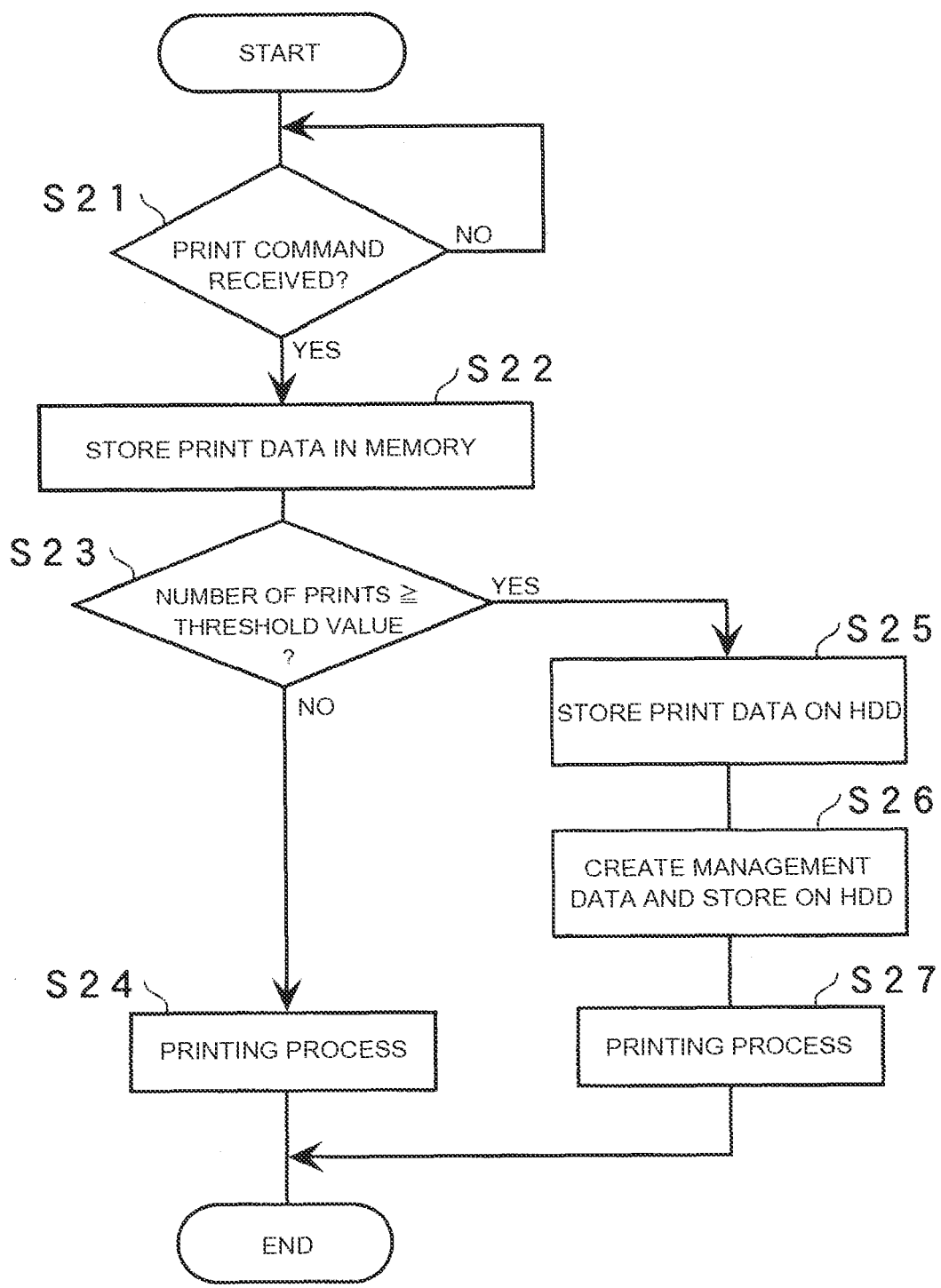
FIG. 5 is a flowchart showing the operation of the multifunction device 100 when a print command that includes print data and the number of prints to be printed is sent from the PC 200 to the multifunction device 100.

FIG. 5 shows the operation of the multifunction device 100 when a print command that includes the print data and the desired number of prints is sent from the PC 200 to the multifunction device 100.

When receiving a print command that includes the print data and the desired number of prints from the PC 200 (step S21), the multifunction device 100 will temporarily store the print data in the memory 14 (step S22). Although the memory 14 normally employs volatile memory, it may employ nonvolatile memory.

Next, it will be determined whether or not the desired number of prints is equal to or greater than the threshold value for determining data holding (step S23). If the desired number of prints is less than the threshold value for determining data holding, the desired number of prints of the print data stored in the memory 14 will be printed (step S24). Then, the current printing process will end.

In step S23, if it is determined that the desired number of prints is equal to or greater than the threshold value for determining data holding, the print data stored in the memory 14 will be stored on the HDD 15 (step S25), and management data corresponding to the print data stored in the HDD 15 will be created and stored on the HDD 15 (step S26). The management data includes a document number that represents the print data, the date and time (year, month, day, and time of day) that the print data was saved, the date and time that the print data is to be erased, and the storage location of the print data on the HDD 15. The date and time that the print data is to be erased will be calculated from the date and time that the print data was saved, and the previously set data holding period.

The desired number of prints of the print data stored in the memory 14 will be printed (step S27). Then, the current printing process will end. Thus, if the desired number of prints is equal to or greater than the threshold value for determining data holding, the print data will be held on the HDD 15.

Note that since the process of automatically erasing the print data held on the HDD 15 is the same as that in FIG. 4, a description thereof will be omitted.

Third Embodiment

A third embodiment of the present invention will be applied to a copying machine.

Figure 6:
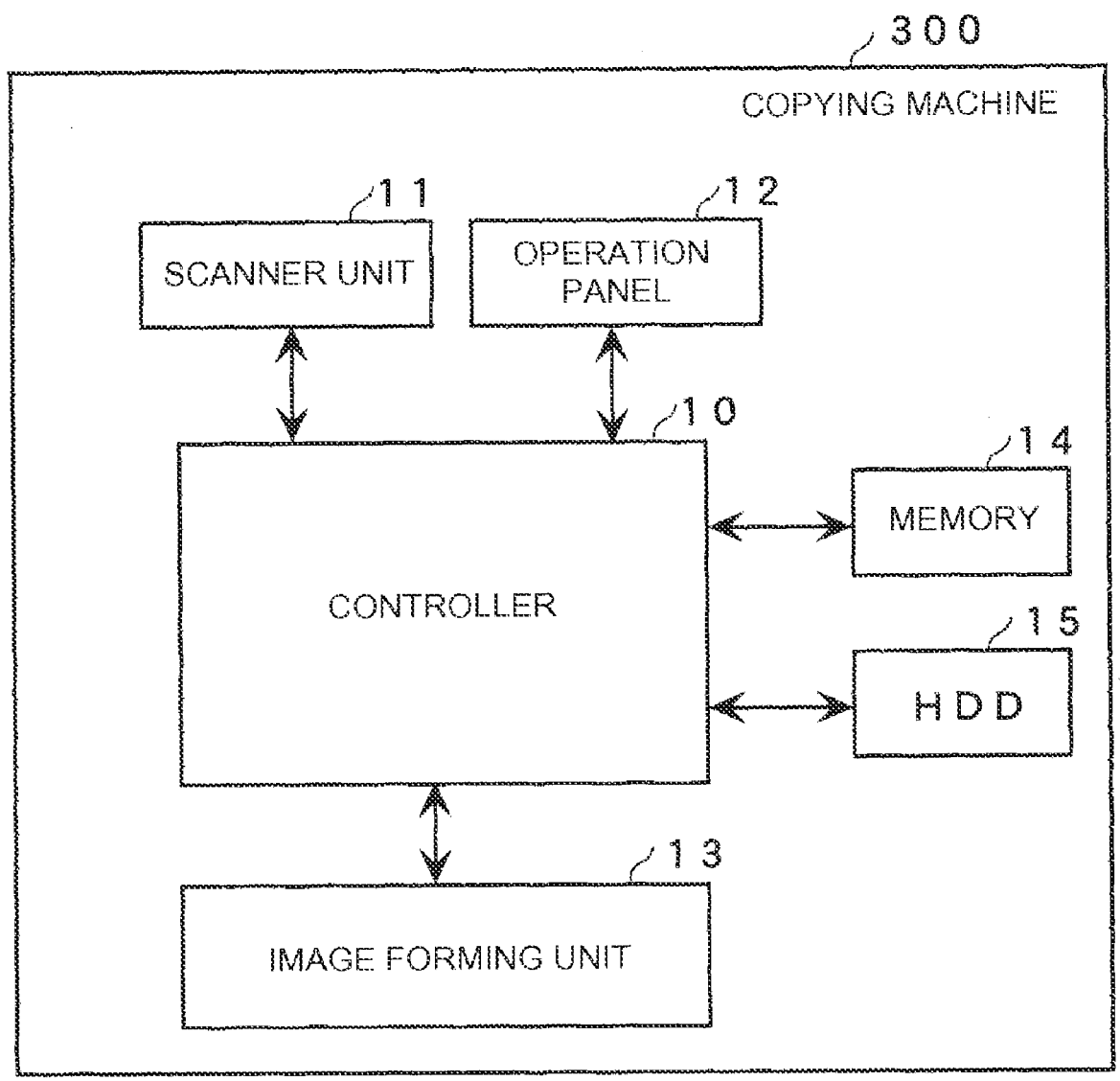
FIG. 6 is a block diagram showing the configuration of a copying machine 300.

FIG. 6 shows the configuration of a copying machine.

A copying machine 300 is provided with a controller 10. The controller 10 is connected with a scanner unit 11, an operation panel 12, an image forming unit 13, a memory 14, and an HDD 15. The operation panel 12 includes a display with a touch panel and various keys, such as a start key, and the like.

When the start key is depressed in order to input a copying command, the copying machine 300 will read an original document placed on the copying machine 300, temporarily store the original document image data (hereinafter referred to as print data) in the memory 14, and then store it on the HDD 15. If the desired number of copies is less than a previously set threshold value for determining data holding, the print data stored on the HDD 15 will be erased after execution of the copying process.

If the desired number of copies is equal to or greater than the previously set threshold value for determining data holding, the print data stored on the HDD 15 will be held for the previously set data holding period even after execution of the copying process. In this situation, management data corresponding to the print data stored in the HDD 15 will be stored on the HDD 15. The management data includes a document number that represents the print data, the date and time (year, month, day, and time of day) that the print data was saved, the date and time that the print data is to be erased, and the storage location of the print data on the HDD 15. The date and time that the print data is to be erased will be calculated from the date and time that the print data is saved, and the previously set data holding period. Note that when the date and time for print data erasure arrives, the print data will be erased from the HDD 15.

The print data held on the HDD 15 will be printed in response to the operation of the copying machine 300 by a user. That is, the user will set a saved document print mode as the operation mode by operating the operation panel 12. When the saved document print mode is set, the controller 10 of the copying machine 300 will display a list of the saved documents based upon the management data stored on the HDD 15. The user will select a document to be printed from the list. In addition, the user will set the number of copies desired. Thereafter, when the start key is depressed, the desired number of copies of the print data corresponding to the document selected by the user will be printed.

Figure 7:
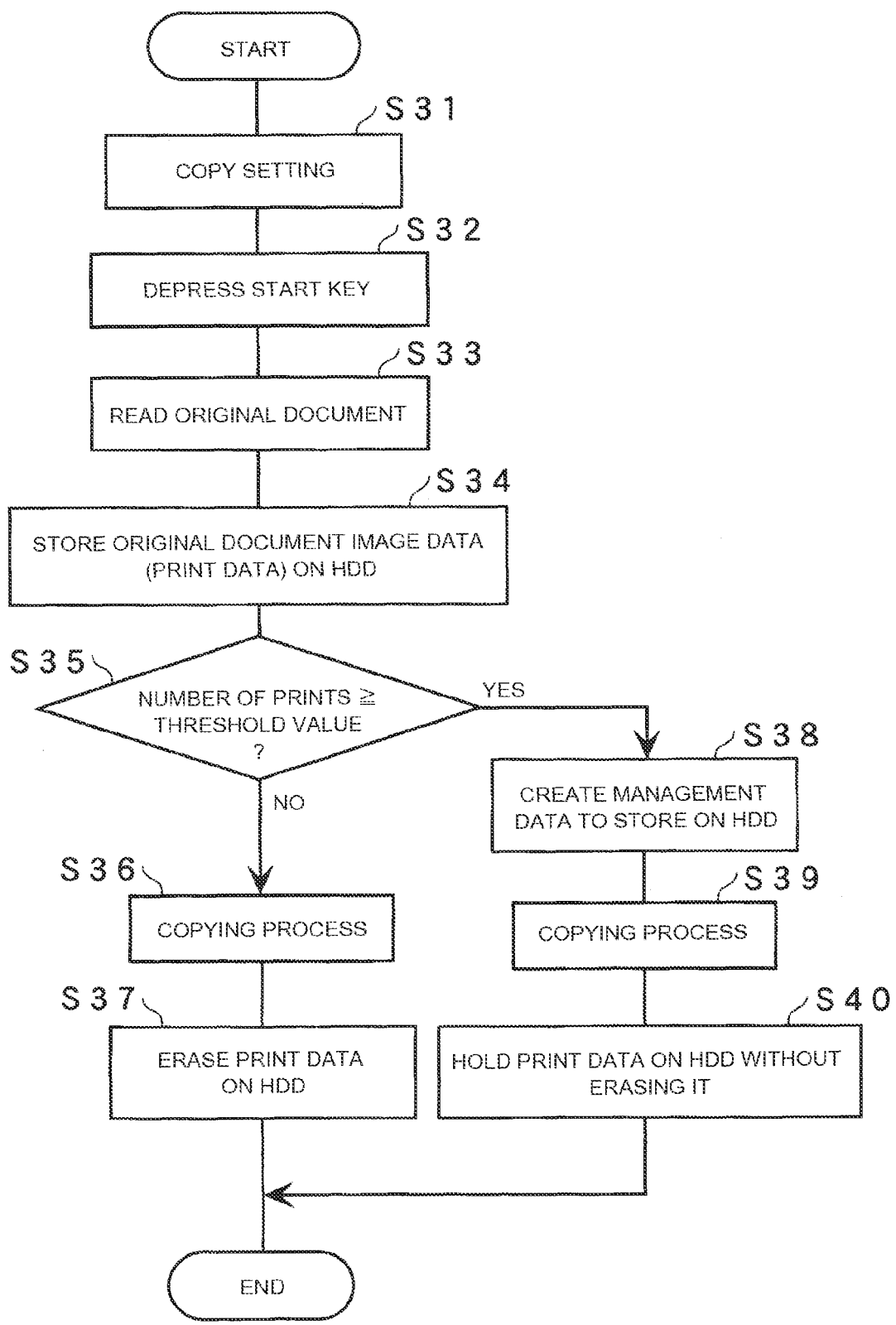
FIG. 7 is a flowchart showing a copy operation by the copying machine 300.

FIG. 7 shows a copy operation by the copying machine 300.

When a copying setting is performed (step S31) and then the start key is depressed (step S32), an original document will be read (step S33) by the copying machine 300, and the original document image data (print data) will be temporarily stored in the memory 14 and then stored on the HDD 15 (step S34).

Next, it will be determined whether or not the desired number of copies is equal to or greater than the threshold value for determining data holding (step S35). If the desired number of copies is less than the threshold value for determining data holding, the desired number of copies of the print data stored in the memory 14 will be printed (step S36). After completion of the copying process, the print data stored on the HDD 15 will be erased (step S37). Then, the current copying process will end.

In step S35, when it is determined that the desired number of copies is equal to or greater than the threshold value for determining data holding, management data corresponding to the print data stored on the HDD 15 will be created, and will be stored on the HDD 15 (step S38). The management data includes a document number that represents the print data, the date and time (year, month, day, and time of day) that the print data was saved, the date and time that the print data will be erased, and the storage location of the print data on the HDD 15. The date and time that the print data will be erased is calculated from the date and time that the print data was saved and the previously set data holding period.

Next, the desired number of copies of the print data stored in the memory 14 will be printed (step S39). Even after completion of the copying process, the print data stored on the HDD 15 is held thereon without being erased (step S40). Then, the current copying process will end.

Note that since the process for automatically erasing the print data held on the HDD 15 is the same as that in FIG. 4, a description thereof will be omitted.

According to the third embodiment, when the desired number of copies to be printed is equal to or greater than the threshold value for determining data holding, the print data is held on the HDD 15 for the previously set data holding period, so as to allow the print data held on the HDD 15 to be easily printed within the data holding period. Thus, if an additional handout is needed after the first printing of the handouts, additional prints of the handout can be easily made.

In addition, the print data for a small number of handouts is not held on the HDD 15 because there is less possibility that additional print will be needed, and thus the HDD 15 can be efficiently utilized. And because the print data that is held on the HDD 15 will be automatically erased after the previously set holding period has lapsed, the HDD 15 can be even more efficiently utilized.

Fourth Embodiment

In a fourth embodiment of the present invention, the configuration of the copying machine is the same as that of the third embodiment. That is, the configuration of the copying machine is as shown in FIG. 6.

In the third embodiment, the copying machine 300 will temporarily store the original document image data (hereinafter referred to as print data) in the memory 14, and then store the print data on the HDD 15 irrespective of the desired number of copies. However, in the fourth embodiment, the copying machine 300 will temporarily store the print data in the memory (volatile memory) 14, and store the print data on the HDD 15 only if the desired number of copies is equal to or greater than the previously set threshold value for determining data holding, and will not store the print data on the HDD 15 if the desired number of copies is less than the previously set threshold value for determining data holding.

Figure 8:
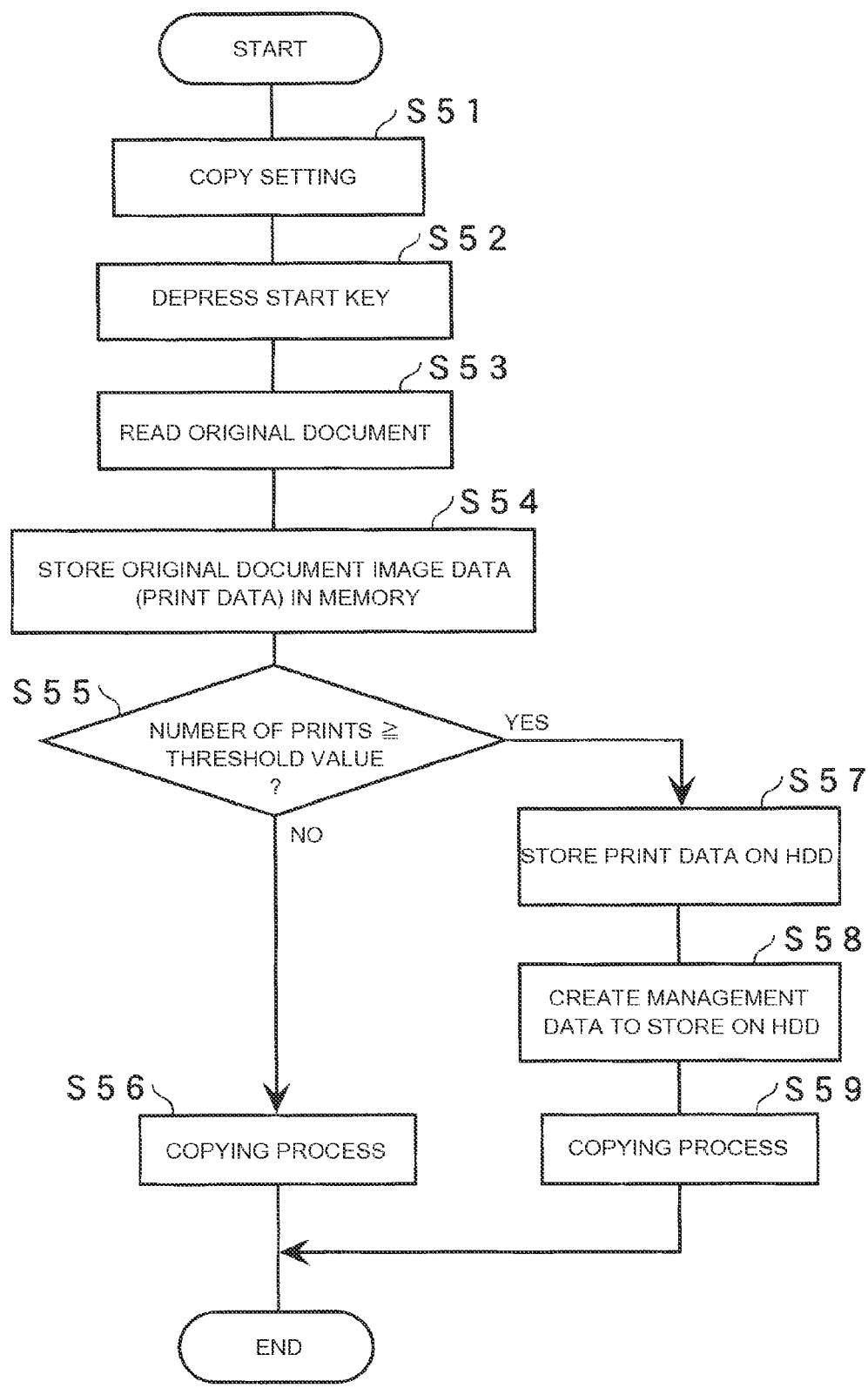
FIG. 8 is a flowchart showing another copy operation by the copying machine 300.

FIG. 8 shows a copy operation by the copying machine 300.

When a copying setting is performed (step S51), and then the start key is depressed (step S52), an original document will be read (step S53) by the copying machine 300, and the original document image data (print data) will be temporarily stored in the memory 14 (step S54). Although the memory 14 normally employs volatile memory, it may employ nonvolatile memory.

Next, it will be determined whether or not the desired number of copies is equal to or greater than the threshold value for determining data holding (step S55). If the desired number of copies is less than the threshold value for determining data holding, the desired number of copies of the print data stored in the memory 14 will be printed (step S56). Then, the current copying process will end.

In step S55, if it is determined that the desired number of copies is equal to or greater than the threshold value for determining data holding, the print data stored in the memory 14 will be stored on the HDD 15 (step S57), and management data corresponding to the print data stored on the HDD 15 will be created and stored on the HDD 15 (step S58). The management data includes a document number that represents the print data, the date and time (year, month, day, and time of day) that the print data was saved, the date and time that the print data is to be erased, and the storage location of the print data on the HDD 15. The date and time that the print data is to be erased will be calculated from the date and time that the print data was saved and the previously set data holding period.

Then, the desired number of copies of the print data stored in the memory 14 will be printed (step S59), and the current copying process will end. Consequently, if the desired number of copies is equal to or greater than the threshold value for determining data holding, the original document image data (print data) will be held on the HDD 15.

Note that since the process of automatically erasing the print data held on the HDD 15 is the same as that in FIG. 4, a description thereof will be omitted.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2005-034469. The entire disclosure of Japanese Patent Application No. 2005-034469 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An image forming device, comprising:
   a unit being configured to receive a print command including print data and a desired number of prints of the print data;
   a unit to receive a plurality of threshold values each being a number selected among a plurality of numbers, set, and changeable by a user, and to receive a plurality of holding periods, each being a number selected among a plurality of numbers, set, and changeable by a user, each holding period corresponding to one of the plurality of threshold values;
   a unit storing the print data in a nonvolatile memory when the print command is received, and determining whether or not the desired number of prints is equal to or greater than each of the previously set threshold values;
   a unit printing the desired number of prints of the print data when the number of prints is less than a threshold value being the lowest of the plurality of threshold values, and then erases the print data stored in the memory after printing the desired number of prints is finished;
   a unit printing the desired number of prints of the print data when the desired number of prints is not less than the threshold value being the lowest of the plurality of threshold values, and then holding the print data without erasing in the memory for the corresponding holding period after printing the desired number of prints is finished; and a unit printing the print data held in the memory again in response to an operation by a user,
   the holding period for storing the print data being changed to be longer, as the one of the plurality of the threshold values is changed to be larger,
   the print data being held in the memory, if the desired number of prints to be printed is not less than the lowest of plurality of threshold value,
   the print data not being held in the memory when the number of prints to be printed is less than the lowest threshold value such that it is less possible that additional prints are needed.

2. The image forming device according to claim 1 further comprising
   a unit that automatically erases the print data held in the memory when the corresponding previously set holding period elapses after the print data are stored in the memory.

3. The image device according to claim 1, further comprising
   a setting screen that displays the threshold value when the threshold value is being set.

4. The image device according to claim 3, wherein
   the setting screen also displays the corresponding holding period.

5. An image forming device, comprising:
   a unit being configured to receive a print command including print data and a desired number of prints of the print data;
   a unit to receive a plurality of threshold values each being a number selected among a plurality of numbers, set, and changeable by a user, and to receive a plurality of holding periods, each being a number selected among a plurality of numbers, set, and changeable by a user, each holding period corresponding to one of the plurality of threshold values;
   a unit storing the print data in a volatile first memory when the print command is received, and determining whether or not the desired number of prints is equal to or greater than each of the previously set threshold values;
   a unit printing the desired number of prints of the print data stored in the volatile first memory when the number of prints is less than a threshold value being the lowest of the plurality of threshold values;
   a unit printing the desired number of prints of the print data stored in the volatile first memory when the number of prints is not less equal than the threshold value being the lowest one of the plurality of threshold values, and then storing the print data stored in the volatile first memory in a nonvolatile second memory for the corresponding holding period; and
   a unit printing the print data held in the nonvolatile second memory again in response to an operation by a user,
   the holding period for storing the print data being changed to be longer, as the one of the plurality of the threshold values is changed to be larger,
   the print data being held in the nonvolatile second memory, if the desired number of prints to be printed is not less than the lowest of plurality of threshold value,
   the print data not being held in the nonvolatile second memory when the number of prints to be printed is less than the lowest threshold value such that it is less possible that additional prints are needed.

6. The image forming device according to claim 5, further comprising
   a unit that automatically erases the print data held in the nonvolatile second memory if the corresponding previously set holding period elapses after the print data are stored in the nonvolatile second memory.

7. The image device according to claim 5, further comprising
a setting screen that displays the threshold value when the threshold value is being set.

8. The image device according to claim 7, wherein
the setting screen also displays the corresponding holding period.

9. An image forming device, comprising:
a unit to receive a plurality of threshold values each being a number selected among a plurality of numbers, set, and changeable by a user, and to receive a plurality of holding periods, each being a number selected among a plurality of numbers, set, and changeable by a user, each holding period corresponding to one of the plurality of threshold values;
a unit reading an original document when a copying instruction is input thereto, storing the original document image data in a nonvolatile memory, and determining whether or not a desired number of copies is equal to or greater than each of the previously set threshold values to determine data holding;
a unit printing the desired number of copies of the original document image data when the desired number of copies is less than a threshold value being the lowest of the plurality of threshold values, and then erasing the original document image data stored in the memory after printing the desired number of prints is finished;
a unit printing the desired number of copies of the original document image data when the desired number of copies is not less than the threshold value being the lowest of the plurality of threshold values, and holding the original document image data without erasing in the memory for the corresponding holding period after printing the desired number of prints is finished; and
a unit printing the original document image data held in the memory again in response to an operation by a user,
the holding period for storing the original document image data being changed to be longer, as the one of the plurality of the threshold values is changed to be larger,
the original document image data being held in the memory, if the desired number of copies is not less than the lowest of plurality of threshold value,
the original document image data for the number of copies less than the lowest threshold value is not held on the memory such that there is less possibility that additional print is needed.

10. The image forming device according to claim 9, further comprising
a unit that automatically erases the original document image data held in the memory when the corresponding previously set holding period elapses after the original document image data are stored in the memory.

11. An image forming device, comprising:
a unit to receive a plurality of threshold values each being a number selected among a plurality of numbers, set, and changeable by a user, and to receive a plurality of holding periods, each being a number selected among a plurality of numbers, set, and changeable by a user, each holding period corresponding to one of the plurality of threshold values;
a unit reading an original document when a copying instruction is input thereto, storing the original document image data in a volatile first memory, and determining whether or not a desired number of copies is equal to or greater than each of the previously set threshold values to determine data holding;
a unit printing the desired number of copies of the original document image data stored in the volatile first memory when the desired number of copies is less than a threshold value being the lowest of the plurality of threshold values;
a unit printing the desired number of copies of the original document image data stored in the volatile first memory when the desired number of copies is not less than the threshold value being the lowest of the plurality of threshold values, and storing the original document image data stored in the volatile first memory in a nonvolatile second memory for the corresponding holding period; and
a unit printing the original document image data held in the nonvolatile second memory again in response to an operation by a user,
the holding period for storing the original document image data being changed to be longer, as the one of the plurality of the threshold values is changed to be larger,
the original document image data being held in the nonvolatile second memory, if the desired number of copies is not less than the lowest of plurality of threshold value,
the original document image data for the number of copies less than the lowest threshold value is not held on the nonvolatile second memory such that there is less possibility that additional print is needed.

12. The image forming device according to claim 11, further comprising
a unit that automatically erases the original document image data held in the nonvolatile second memory when the corresponding previously set holding period elapses after the original document image data are stored in the nonvolatile second memory.

13. The image device according to claim 11, further comprising
a setting screen that displays the threshold value when the threshold value is being set.

14. The image device according to claim 13, wherein
the setting screen also displays the corresponding holding period.

* * * * *